(12) United States Patent
Moss et al.

(10) Patent No.: US 7,957,016 B2
(45) Date of Patent: Jun. 7, 2011

(54) METHOD AND APPARATUS FOR IMAGE PROCESSING

(75) Inventors: Roy Gideon Moss, Palo Alto, CA (US); Douglas Gene Keithley, Boise, ID (US); David Alan Bartle, Boise, ID (US)

(73) Assignee: Marvell International Technology Ltd., Hamilton (BM)

( * ) Notice: Subject to any disclaimer, the term of this patent is extended or adjusted under 35 U.S.C. 154(b) by 1479 days.

(21) Appl. No.: 10/945,735

(22) Filed: Sep. 20, 2004

(65) Prior Publication Data

US 2006/0061827 A1    Mar. 23, 2006

(51) Int. Cl.
 *G06F 3/12* (2006.01)
 *G06T 5/00* (2006.01)
 *H04N 1/407* (2006.01)
 *H04N 1/409* (2006.01)
 *G06K 15/00* (2006.01)
 *G06K 9/40* (2006.01)

(52) U.S. Cl. ............ 358/1.15; 358/3.27; 358/1.17; 382/254

(58) Field of Classification Search .......... None
See application file for complete search history.

(56) References Cited

U.S. PATENT DOCUMENTS

| 5,005,139 | A | 4/1991 | Tung |
| 5,559,951 | A | 9/1996 | Lentz et al. |
| 6,246,396 | B1 * | 6/2001 | Gibson et al. ............ 345/604 |
| 6,665,454 | B1 | 12/2003 | Silverbrook et al. |
| 6,674,536 | B2 * | 1/2004 | Long et al. ............ 358/1.15 |
| 6,753,873 | B2 | 6/2004 | Dixon et al. |
| 6,782,142 | B2 * | 8/2004 | Loce et al. ............ 382/296 |
| 6,834,124 | B1 * | 12/2004 | Lin et al. ............ 382/261 |
| 7,093,077 | B2 * | 8/2006 | Cooksey et al. ............ 711/137 |
| 7,340,105 | B2 * | 3/2008 | Keithley et al. ............ 382/254 |

* cited by examiner

*Primary Examiner* — Twyler L Haskins
*Assistant Examiner* — Marcus T Riley (57) ABSTRACT

A method for image processing loads a cache line width column of image data into a data cache. The cache line width column of image data is then processed to enhance the image data; and the enhanced image data is then outputted.

14 Claims, 5 Drawing Sheets

METHOD AND APPARATUS FOR IMAGE PROCESSING

BACKGROUND ART

The present invention relates generally to printers, and more particularly to a method and apparatus for optimizing memory access for image processing. Printers have become very popular in recent times due to their greatly improved ability to print clear images. Generally, printers are available as monochrome only printers, such as printers that print only in gray and black, or color printers that print in color as well as monochrome. These printers operate by converting an image on a client device such as a personal computer into data that is received by a formatter that stores the data in the printer. The formatter generates coded data representing the image, which is then transmitted by the formatter to a print engine that drives the mechanisms of the printer to convert the data back into an image that is printed on a print medium, such as paper. Similar procedures can be followed for generating images for displaying on devices such as computer monitors.

Printing devices and display devices that are used by computers and by computer-related devices, such as digital cameras, generally utilize a two-dimensional matrix of image elements or pixels. Each pixel in a color image matrix, for example, comprises a Red ("R"), Green ("G"), and Blue ("B") cell. Each such cell is represented by a corresponding memory cell that may store a numeric value. Memory cell values may typically be 8, 10, or 12 bits in size, or may be stored in any other convenient size. The memory cell values for the colors of each pixel may be stored separately in the computer memory, or may be merged into a single memory address location. A computer program can then cause a particular pixel to be printed in any visible color, or to appear black or white, by setting the numeric values of its red, green, and blue cells to appropriate values for the printer.

In many products and applications, some of the pixel information is generated or "interpolated" by a computer microprocessor ("CPU"), based on other information. This processing of the pixel information improves the overall quality of the printed image produced by the printer.

Depending upon the type of printer being utilitized, the processing may be used, for example, to remove artifacts from the image, such as "toner explosion". ("Toner explosion" refers to toner that is scattered when moisture in the media suddenly vaporizes.) The processing may also be used to calibrate the image information for the printer to adjust for particular printer characteristics so that the final printed image faithfully reproduces the original image. The processing can also be used to enhance the printed image to improve it over the original image, for example, by the removal of "red eye" in a photograph.

Such artifact removal, image enhancement, resolution enhancement, and so forth, is performed serially on the image data on a pixel-by-pixel basis. In one process, the pixels are individually "windowed" by selecting a small window or matrix of the pixels that surround and include the pixel that is being processed. The particular processing that is then performed on the selected (or "current" or "target") pixel is then based on the values of the surrounding pixels.

Unfortunately, the image enhancement information is not stored in memory in a manner that efficiently supports such pixel windowing processing. Rather, image information is typically stored on a row-by-row basis, moving progressively from the top edge of the page to the bottom, for example. Therefore, it is necessary to read the entire data for all the lines in which the pixel window is located in order to collect the information for just the few pixels that form the window that actually surrounds the target pixel. This major quantity of data needs to be read just to construct the small window matrix of pixels so that the target pixel can be processed. Thus a large amount of information must be inefficiently read and discarded simply to extract or recover the relatively small amount of information needed for processing a particular pixel. The problem is then compounded because essentially the same information must then be read and discarded again and again for each successive cache line width of pixels and pixel windows.

The amount of information that must be repeatedly retrieved by this process is much greater than can be held in the high-speed cache memory of the computer processor. Computer processing time is therefore wasted while the processor has to wait each time for the information to be retrieved from the slower general memory of the computer. The delays can be even worse if the information must be retrieved from yet far slower storage such as, for example, a hard disk drive.

Thus, to support ever-increasing printer operating speeds, prior solutions have resorted to increasingly expensive specialized hardware solutions, such as large, dedicated, high-speed memories (e.g., high-speed SRAMs). Such solutions, however, cause ever-increasing hardware and manufacturing costs, whereas the historical trend in the industry has been the opposite—declining costs accompanied by increasing performance.

Thus, a need still remains for faster, more efficient, more effective, and less expensive methods and mechanisms for optimizing memory access for image processing. In view of the continuing increases in performance, capabilities, and customer expectations, accompanied by ever-increasing competition and declining prices, it is ever more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method for image processing operations on pixel windows. A cache line width of image data is loaded into a data cache. It is combined with previously read cache lines to form several pixel windows. The pixels at the center of the windows are enhanced, and then outputted. The next cache line that is read is vertically below the previous one in a two dimensional representation of the image.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

In the following description, numerous specific details are given to provide a thorough understanding of the invention. However, it will be apparent to one skilled in the art that the invention may be practiced without these specific details. In order to avoid obscuring the present invention, some well-known circuits, system configurations, and processing steps are not disclosed in detail. Likewise, the drawings showing embodiments of the invention are semi-diagrammatic and not to scale and, particularly, some of the dimensions are for the clarity of presentation and are shown exaggerated in the FIGS. In addition, where multiple embodiments are disclosed and described having some features in common, for clarity and ease of illustration, description, and comprehension thereof, similar and like features one to another will ordinarily be described with like reference numerals.

As used herein, the term "printer" will be understood to encompass all image printing devices that receive a data stream representing an image and, from that data stream, print the represented image on a print medium, for example, a sheet of a paper. The term "print medium", as used herein, will be understood to encompass paper, paper-based products and sheets or planar sections of all other material on which an image may be printed. The term "print medium" will also be understood to encompass an intermediate transfer belt or similar device on which an image is built up before being transferred to another print medium.

Figure 1:
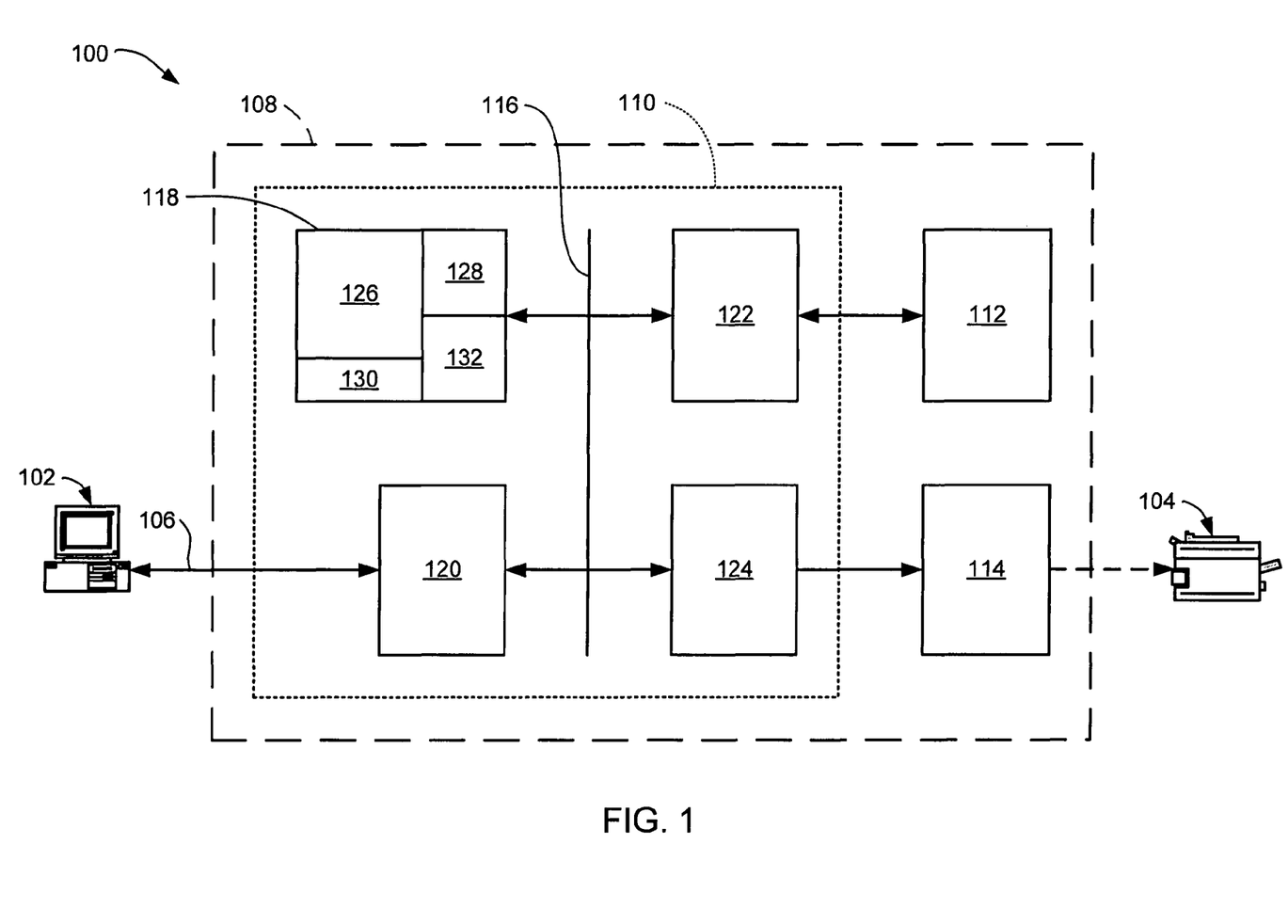
FIG. 1 is a block diagram of a printing system in accordance with an embodiment of the present invention.

Referring now to FIG. 1 therein is shown a block diagram of a printing system 100 in accordance with an embodiment of the present invention. The printing system 100 includes a printer client device 102, such as a personal computer (illustrated), a mainframe computer, a server, a scanner, a modem, a fax machine, a video camera, a security camera, a videocassette recorder, a digital videodisc, a laser disc player, a personal digital assistant, a wireless telephone, a mobile telephone, or any other device capable of generating or transmitting image data for printing. The printing system 100 also includes a printer 104, which can be a monochrome or color printer.

A connection 106 is provided between the printer client device 102 and the printer 104 over which the printer client device 102 can transmit image data in the form of print jobs to the printer 104. The connection 106 may be a direct serial or parallel connection between the printer client device 102 and the printer 104. Alternatively, the connection 106 may be over a local area network ("LAN") or a wide area network ("WAN"). The connection 106 may also be a wireless connection or any other connection over which data can be transferred from the printer client device 102 to the printer 104.

The printer client device 102 customarily runs an application that generates image data representing an image that is to be printed. The image data is transmitted to a client printer driver that also customarily runs on the printer client device 102. The client printer driver configures the image data into a form appropriate for transmission to the printer 104 through the connection 106.

The image data is received by a printer formatter board 108 located within the printer 104 (but shown externally thereof in FIG. 1 for clarity of illustration). The printer formatter board 108 provides processing circuitry that formats the image from the printer client device 102 for printing on the printer 104. The formatting of the image will typically include pixel-by-pixel processing of the image elements to optimize the image according to the particular characteristics of the printer 104. Such enhancement, for example, may include artifact removal (e.g., toner explosion), single dot enhancement, line enhancement, contrast enhancement, color enhancement, resolution enhancement, color trapping, and so forth, as is known and performed in the art.

Included on the printer formatter board 108 is an integrated circuit 110 for performing the processing of the image data for the printer 104. Because such integrated circuits are usually customized for the particular printer characteristics, the integrated circuit 110 is commonly an application specification integrated circuit ("ASIC"). The printer formatter board 108 will also include additional elements such as a main memory 112 and an internal printer driver 114.

The integrated circuit 110 includes an internal bus 116 that connects a microprocessor 118, a host interface controller 120, a memory controller 122, and a video controller 124. The microprocessor 118 includes a processor 126, a data cache 128, customized instructions 130, and an instruction cache 132. The memory controller 122 connects to and controls the main memory 112. The host interface controller 120 connects to the printer client device 102 through the connection 106. The video controller 124 provides the output from the integrated circuit 110 to the internal printer driver 114 for communication to and control of the specific printing hardware in the printer 104.

In the operation of one embodiment of the printer formatter board 108, for example, a full page of the data that is to be printed will be transmitted by the printer client device 102 through the connection 106 to the integrated circuit 110 and stored as a single contiguous image in the main memory 112 of the printer formatter board 108. In another embodiment, the page to be printed is transmitted from the printer client device 102 in multiple compressed "strips". Before being printed, the strips are decompressed by the microprocessor, or by a dedicated decompressor that stores the data back into the main memory 112, or by in-line decompression blocks in the video print path. The microprocessor 118 then reads the stored image data from the main memory 112, processes it pixel by pixel, and then stores the processed data back into the main memory 112. At the appropriate time, the video controller 124 then takes the processed data from the main memory 112 and sends it out for printing to the printer 104.

Figure 2:
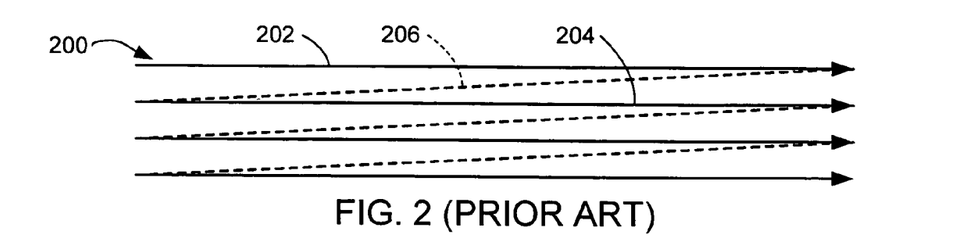
FIG. 2 (PRIOR ART) illustrates a processing sequence previously utilized for processing image pixels for image enhancement and artifact removal.

Referring now to FIG. 2 (PRIOR ART), therein is shown diagrammatically a processing sequence 200 previously utilized for processing image pixels for image enhancement and artifact removal. In this process, the image data is scanned in the same sequence in which the data is received from a printer client device (such as the printer client device 102 (FIG. 1)) and stored in the main memory 112. This is illustrated by an arrow 202 representing the scanning across the page of the top, first line of image data. The next image line is then scanned in the same direction, as represented by an arrow 204, with a return trace 206 exemplifying the instantaneous return from the arrow 202 to continue the scanning with the arrow 204. The process continues until the number of lines necessary for processing the first pixel has been read and the data retrieved.

A typical procedure for processing a given pixel is to construct a window of pixels around the selected, or target, pixel. The window may be, for example, a three-column by five-row window of pixels, with the target pixel in the center. (See, for example, the pixel window 404 surrounding the target pixel 402 in FIG. 4.)

Unfortunately, the amount of cache memory available in a general purpose microprocessor is much too little to absorb and retain all of the information in all of the lines represented by the arrows 202, 204, and so forth, during construction of a pixel window of the desired dimensions. Accordingly, the information that is unrelated to the specific window being constructed must therefore be discarded from the microprocessor cache. Unfortunately, that information must accordingly be read again and again as the next and each succeeding pixel window is constructed. Because the information is being read from a main memory, such as the main memory 112 (FIG. 1), the microprocessor must then repeatedly pause and wait as each data line is reread from the comparatively slow main memory.

Another previous technique is to use large amounts of specialized hardware including large amounts of high-speed memory. This can be done with an ASIC. However, the overall cost for obtaining high performance in this manner is very great.

Figure 3:
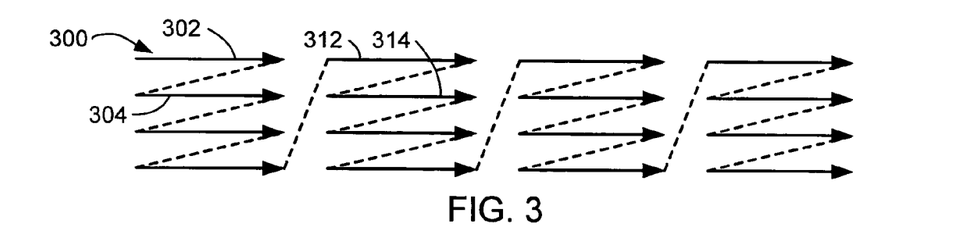
FIG. 3 illustrates a processing sequence according to an embodiment of the present invention.

Referring now to FIG. 3, therein is shown a processing sequence 300 according to an embodiment of the present invention. The processing sequence 300, rather than scanning the entire width of the image, scans across the image data only the width of a cache line ("cache line width"), as illustrated by the series of arrows beginning with an arrow 302 followed by an arrow 304 and continuing downwardly.

In computer architecture, the cache line width is normally a multiple of the computer microprocessor ("CPU") native data size. Common multiples are 4 or 8. Thus, a typical cache line width for a 32-bit CPU is, for example, 128 bits or 256 bits.

The number of pixels represented in a single cache line will depend on bit depth (i.e., the number of bits used to represent each pixel). Each cache line will represent pixels on a single row of data. Different rows will be read into separate cache lines. The image may be divided, for example, into strips of 32-128 lines, according to the amount of data that can be processed and stored in memory. For example, with 600 dots-per-inch ("dpi") data, there are more lines in a strip than with 1200 dpi data because of the size of the strips in the main memory 112. In some cases this may result in fewer lines than the size that the data cache 128 could actually support, leaving the cache line width column with less than the maximum height possible. In fact, the column height may be limited to as little as necessary to be able to start processing. Typically, the height (number of rows) of the cache line widths of data is thus not the height of an entire representative image since that amount of data would ordinarily not fit in the usual data cache of a general purpose microprocessor. Also, the data cache 128 is not used just for incoming pixel data, thus placing further restrictions on the actual available cache memory for the cache line width column of pixel data.

Thus, the cache line width can be in any of several different denominations, such as bits, bytes, or pixels. The cache line width in pixels of a single cache line will vary with the bit depth of the pixel data.

"Cached pixel data" thus refers to the group of cache lines that contains the rectangular array of pixel data that are currently in the data cache. The cached pixel data is a number of lines in height and a cache line width wide. The number of lines is at least as many as the pixel window but the cached pixel data typically contains additional lines.

Due to the limited size of the microprocessor's high speed data cache, the cache line width will therefore be less than the entire width of the image data. The present invention thus does not normally scan from the main memory all the columns of the image data in order to obtain the information needed to construct the desired pixel window. Rather, only a cache line width of a certain height (number of lines) is retrieved from the main memory. Then, by scanning downwardly a cache line width in this manner, the data cache of the processor is filled without the necessity for multiple reads and multiple processing of the image data from the main memory, such as the main memory 112 (FIG. 1), each time a pixel window is to be constructed and processed.

Once the group of cache lines (the cached pixel data) is in the processor data cache, the processing of the individual pixels, using the pixel windows, commences and progresses at very high speed since all of the necessary information is rapidly available in the high speed processor data cache memory. Since the cache line width will ordinarily include many more columns than the width of each pixel window, a significant amount of pixel processing can be accomplished very, very rapidly.

Figure 4:
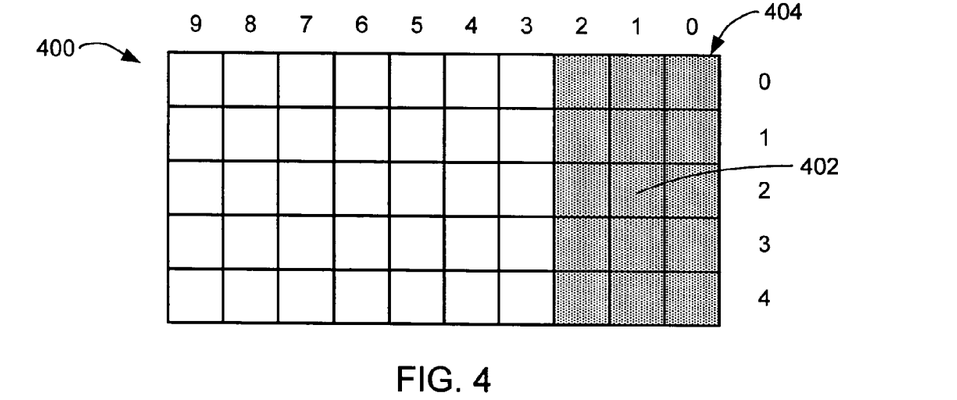
FIG. 4 is a representation of a portion of a cache line width of cached pixel image data.

Referring now to FIG. 4, therein is shown a representation of a portion 400 of a cache line width of cached pixel image data. The portion 400 is shown at the commencement of the processing of the pixels of the image information following the scanning into the microprocessor cache of the image data, such as illustrated and described with reference to FIG. 3. Thus, in one processing embodiment, a target pixel 402 is shown in the center of a pixel window 404 of dimension 5 rows by 3 columns. The pixel window 404 has been generated of image data from the data cache 128 of the microprocessor 118. The processing of the target pixel is then performed in known fashion by obtaining an image enhancement value for the target pixel 402 in the pixel window 404 and outputting the enhanced target pixel value according to the obtained image enhancement value.

Figure 5:
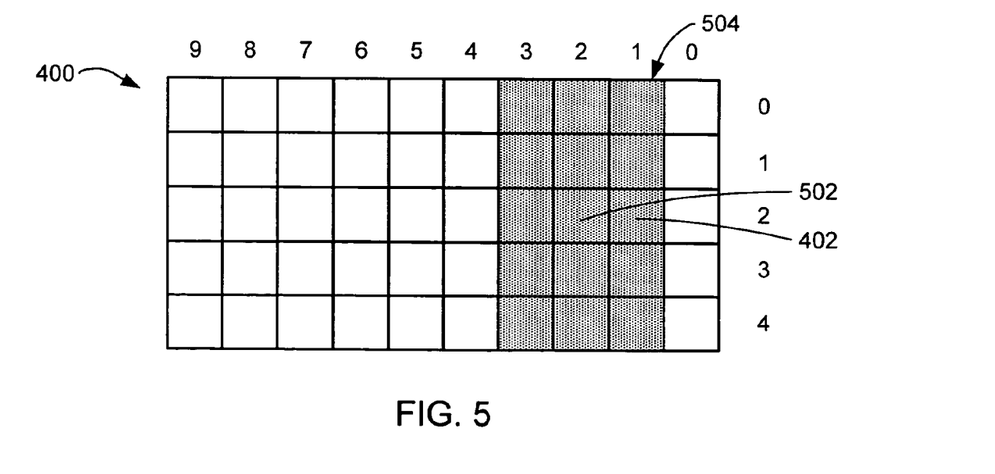
FIG. 5 is a representation of the portion of the cache line width of cached pixel image data shown in FIG. 4 following processing of the target pixel therein and commencement of the processing of another target pixel in an indexed pixel window of the same dimensions.

Referring now to FIG. 5, therein is shown a representation of the same portion 400 of the cache line width of cached pixel image data following processing of the target pixel 402 and commencement of the processing of a target pixel 502 in an indexed pixel window 504 of the same dimensions. A comparison of FIG. 5 with FIG. 4 shows that the pixel window 504 in FIG. 5 has indexed or stepped over one column from the position of the pixel window 404 shown in FIG. 4. The pixels themselves in both FIGS. are identical since the results of the processing of the target pixels are stored and buffered in a separate memory location as the pixel processing progresses through the image data.

Following the processing of the target pixel 502, the pixel window is again indexed one column width to the left, continuing the process shown in the sequence from FIG. 4 to FIG. 5, and so forth, until this entire cache line width of cached pixel data has been processed as desired. The row position is then incremented downwardly by one, and the column position is reset to the initial column. (In one embodiment, the column position is returned to the initial column by returning it by the width of the cache line.) This procedure is continued, line by line, until the entire cached pixel data in the data cache 128 (FIG. 1) has been processed.

The invention thus pulls the data out of the cached pixel data to build multiple pixel windows of data. The pixel windows, such as the pixel windows 404 and 504, that are built from this data are then progressively walked around in the cached pixel data, as described, to process pixels before going on to get the next set of data from the main memory 112. The next set of data from the main memory 112 is then a cache line width over from the data that was last processed. Thus the width of the arrow 302 is a cache line width.

Referring again to FIG. 3, the next cache line width column of information, represented by an arrow 312, an arrow 314, and so forth, is then scanned downwardly by the same cache line width. (For clarity of illustration, the arrows 312 and 314 are shown spaced horizontally from the arrows 302 and 304. It will be understood that in practice the respective columns represented by these arrows will be contiguous.)

The process then continues similarly, in the same fashion as described with respect to FIGS. 4 and 5, in (or using) the next cache line width column of information represented by the arrows 312, 314, and so forth. At the conclusion of this cache line width column of information the next cache line width column of information is read and processed, continuing in like manner until the entire page of image data has been processed. In this manner, memory access for image processing is optimized, with maximum memory read efficiency, since the slower main memory 112, which contains the entire image pixel data, does not need to be consulted multiple times, once each for the processing of each pixel in sequence.

Figure 6:
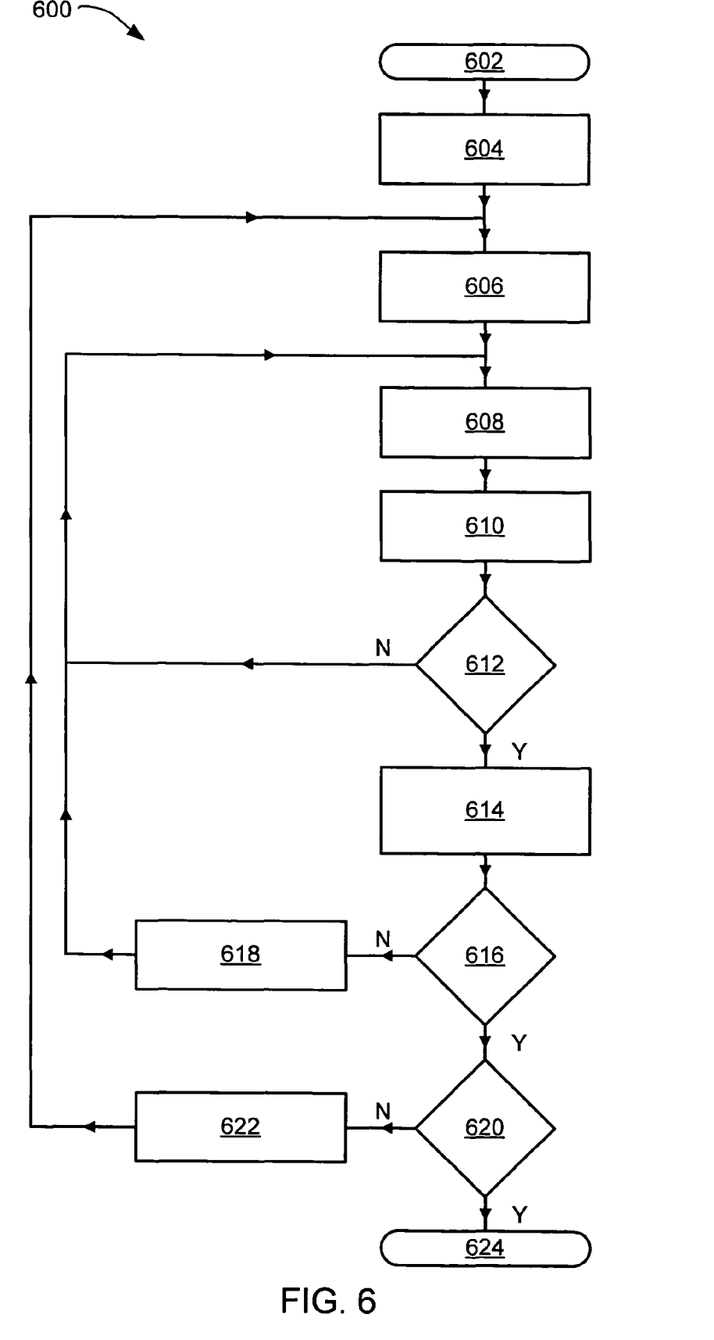
FIG. 6 is a flow chart of an embodiment of a method for printer image processing according to the present invention.

Referring now to FIG. 6, therein is shown a flow chart 600 of an embodiment of a method for printer image processing according to the present invention. The flow chart 600 begins with a block 602 that represents the start of the processing of an image page. Next, in a block 604, the row and column counters are reset to 1. Then, in a block 606, a cache line width column of image data is read into the data cache 128 (FIG. 1) from the main memory 112 (FIG. 1).

In a block 608, a pixel window, such as the pixel window 404 (FIG. 4), is then generated and the target pixel, such as the target pixel 402 (FIG. 4) is processed. The column position is then incremented in a block 610.

Next, in a decision block 612, a check is made to determine if the incrementing of the column has moved it into the next cache line width or if it is still in the current width. If the column has not moved into the next cache line width, decision line N is followed and the process is returned to the block 608. If the column has incremented into the next cache line width, decision line Y is followed to a block 614, in which the row is incremented by 1.

Next, in a block 616, a check is made to determine whether the last row has been reached. If not, decision line N is followed to a block 618 in which the column is reset by the cache line width, following which the process returns to the block 608.

If the last row has been reached in the block 616, decision line Y is followed to a decision block 620, where a check is made to see if the last column has been reached. If not, decision line N is followed to a block 622 where the row counter is reset to 1, following which the process returns to the block 606. If the decision in the decision block 620 is that the last column has been reached, decision line Y is followed to a block 624, in which the page processing is ended.

Thus, as the center (or target) pixel in the pixel window is processed and the flow chart 600 is followed, the present invention unrolls multiple software loops to construct a full pixel output word of the processed pixels. As each pixel output word is then completed, it is stored back to the main memory 112 (FIG. 1). The process thus effectively walks the cache line, with the number of loops being equal to the cache walk. For efficiency, as each output cache line is constructed, it may be evicted by software command from the cache to avoid polluting it and to avoid stalling of the CPU. In addition, once an input cache line has been used by all the pixel windows that refer to it, it may be evicted by software command from the cache to avoid polluting it.

Figure 7:
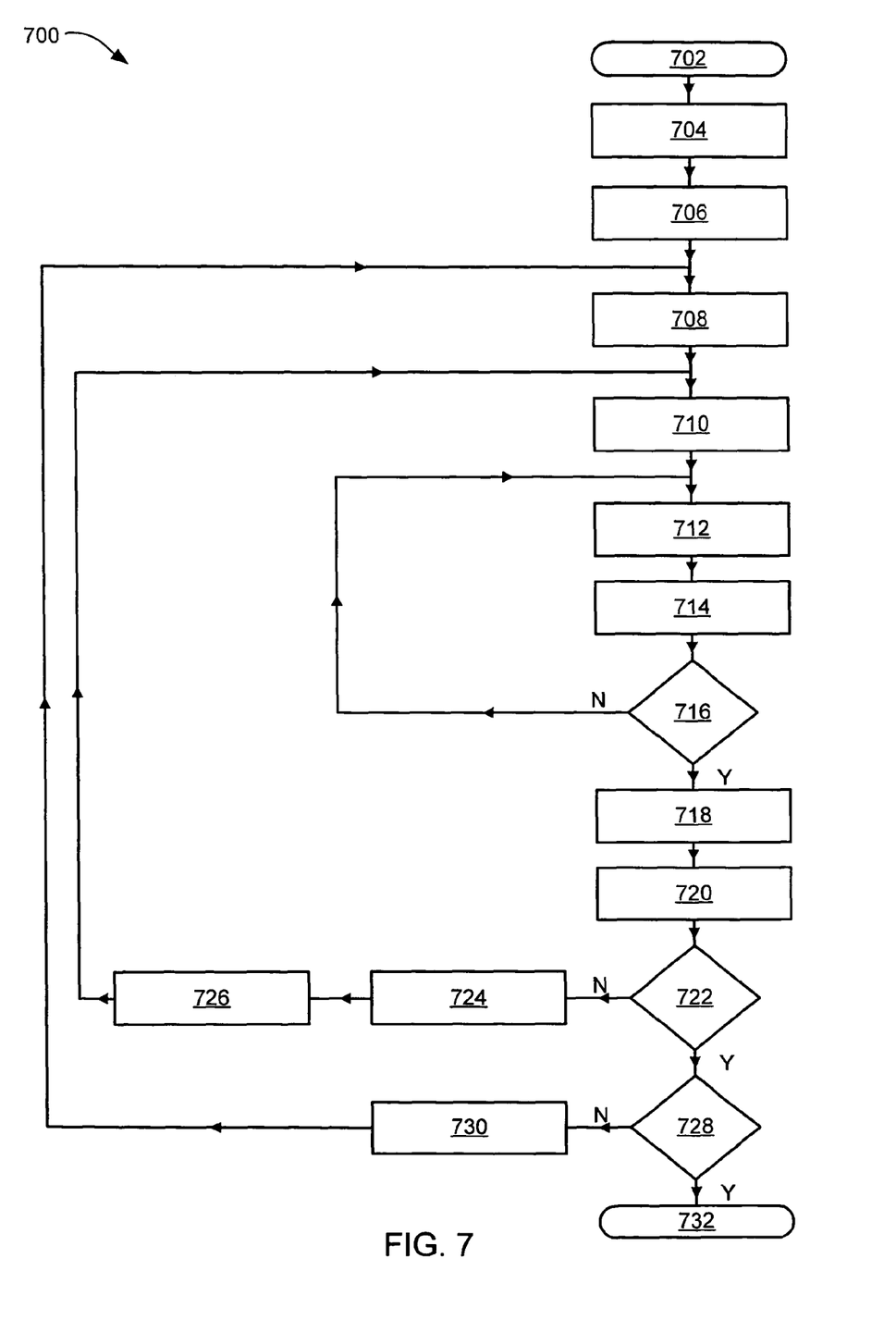
FIG. 7 is a flow chart of an embodiment of the present invention incorporating several features that further improve the performance of the present invention.

Referring now to FIG. 7, therein is shown a flow chart 700 of an embodiment of the present invention incorporating several features that further improve the performance of the present invention. These improvements include buffering the edge of the cache line, and providing a cache line prefetch.

With regard to buffering the edge of the cache line, it will be appreciated (for example, see FIG. 4) that the pixel window for a target pixel includes, in some processing configurations, information (i.e., pixels) from an adjacent cache line column when the target pixel is at the edge of the current (or "active") cache line. Thus, either the information from the adjacent cache line column will not be available, or ordinarily it would need to be read again from the main memory, such as the main memory 112 (FIG. 1). Therefore, to improve efficiency, an embodiment of the present invention preserves the edge pixel information in an edge buffer as a cache line is being processed. The edge information is then readily and easily available when needed during processing of the next, adjacent cache line information.

For processing of a cache line, therefore, with buffering of the edge data, the memory array is first zeroed out at the start of processing because at that point the memory array represents the margin of the page. The cache line width column of information is then loaded from main memory and the edge pixel information, as appropriate to the processing that is to take place, is then stored in an edge data cache buffer region of the processor data cache, such as the data cache 128 (FIG. 1). The processing sequence then continues as before, with the additional proviso that as successive edge pixels are processed, the new information is then stored in the edge cache buffer to be available for the next cache line width processing.

With regard to cache line prefetching, as the processor moves through the cache line width pixel information in the data cache 128, and as the processed pixel information is read back into the main memory 112 (FIG. 1), the data in that portion of the data cache 128 is then (except for the buffered edge data) no longer needed. Accordingly, additional time can be saved and additional efficiencies realized by commencing loading of the next cache line into the cache memory areas where this prior processing has been completed. That is, the next cache line can be prefetched as the processor data cache memory becomes available following processing of the oldest current cache line.

Both of these features—buffering of edge data and cache line prefetch—are incorporated into the flow chart 700. Thus, the flow chart 700 begins with a block 702 that represents the start of the processing of an image page. Next, in a block 704, the row and column counters are reset to 1. Then, in a block 706, the edge cache memory is zeroed.

In a block 708, several cache lines, comprising at least the height of the pixel window, are read into the data cache 128 (FIG. 1) from the main memory 112 (FIG. 1). Then, in a block 710 the edge information from the edge data cache is loaded with the appropriate edge information.

Next, in a block 712 a pixel window, such as the pixel window 404 (FIG. 4), is generated and the target pixel, such as the target pixel 402 (FIG. 4) is processed. The column position is then incremented in a block 714.

Next, in a decision block 716, a check is made to determine if the incrementing of the column has moved it into the next cache line or if it is still in the current cache line. If the column has not moved into the next cache line, decision line N is followed and the process is returned to the block 712.

If the column has incremented into the next cache line, decision line Y is followed to a block 718. In the block 718 the edge data is stored in the cache memory with the corresponding row index. Then, in a block 720, the row is incremented by 1.

Next, in a decision block 722, a check is made to determine whether the last row has been reached. If not, decision line N is followed to a block 724 in which the column is reset by the cache line width. Then, in a block 726, the next line of data, having a width of the cache line width, that has not yet been read from the main memory 112, is prefetched from the main memory 112 into the data cache 128. The process then returns to the block 710.

If the last row has been reached in the decision block 722, decision line Y is followed to a decision block 728 where a check is made to see if the last column has been reached. If not, decision line N is followed to a block 730 where the row counter is reset to 1, following which the process returns to the block 708. If the decision in the decision block 728 is that the last column has been reached, then decision line Y is followed to a block 732, in which the page processing is ended.

Thus, as the center pixel in the pixel window is processed, and the flow chart 700 is followed, the present invention unrolls multiple software loops to construct a full pixel output word of the processed pixels. As each pixel output word is thus completed, it is stored back to the main memory 112 (FIG. 1). The process thus effectively walks the cache line, with the number of loops being equal to the cache walk. For efficiency, as each output cache line gets constructed, it may be evicted by software command from the cache to avoid polluting it and to avoid stalling of the CPU. In addition, once an input cache line has been used by all the pixel windows that refer to it, it may be evicted by software command from the cache to avoid polluting it.

Figure 8:
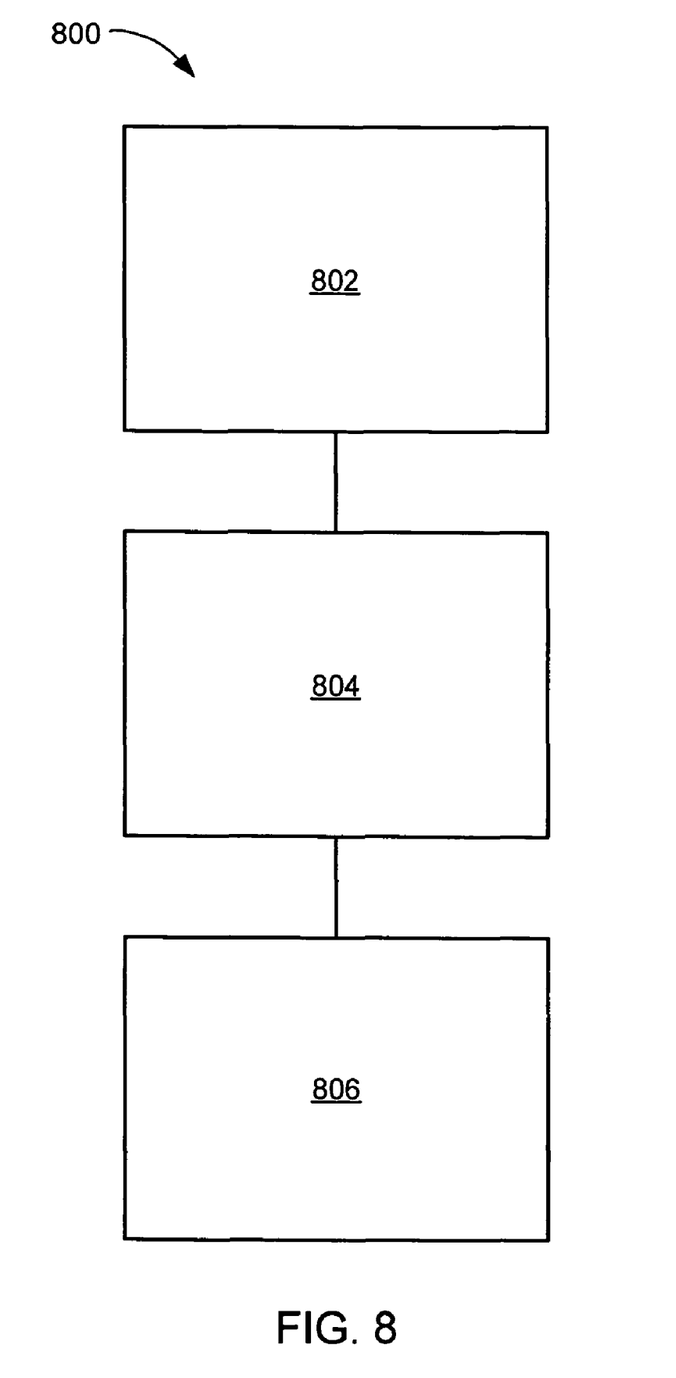
FIG. 8 is a flow chart of a method for image processing in accordance with the present invention.

Referring now to FIG. 8, therein is shown a flow chart of a method 800 for image processing in accordance with the present invention. The method 800 includes loading a cache line width column of image data into a data cache, in a block 802; processing the cache line width column of image data to enhance the image data, in a block 804; and outputting the enhanced image data, in a block 806.

It has been discovered that the present invention thus has numerous advantages. A major advantage of the present invention is that it provides faster, more efficient, more effective, and less expensive methods and mechanisms for optimizing memory access for image processing.

A particular advantage is that the image processing can be done using only the cache memory of a general purpose microprocessor, without the need for repeated reads of and access to the same image information from slower system main memory.

Another advantage of the present invention is that it is not limited just to use in printers, but can also be beneficially applied to image processing for the full range of image generation and display technologies. Thus, for example, in addition to use in printers, the present invention can also be used for image processing in display devices such as computer displays, cell phones, video cameras, personal digital assistants, and so forth.

Still another advantage is that the processing of the image data can be done in any desired direction, as may be appropriate to the application at hand. Thus, while described herein with respect to horizontal cache lines, vertical cache line width columns, and horizontal progressions of the pixel windows, it will now be clear to one of ordinary skill in the art, based upon the teachings herein, that configurations and processing progressions in any direction may be implemented as desired. Thus, for example, the term "cache line width column" is to be understood in the broadest sense as not being limited to a particular direction, whether vertical, horizontal, or an angle in between. Similarly, appropriate combinations and variations, including for example skewed columns and/or rows, may be employed within the teachings and scope of the present invention and disclosure with the same significant beneficial improvements in processing speeds, performance, and hardware economies.

Thus, it has been discovered that the image processing accelerating method and apparatus of the present invention furnish important and heretofore unknown and unavailable solutions, capabilities, and functional advantages for increasing image processing speeds and significantly reducing delays caused by main memory access. Savings and benefits are also realized through reduced hardware and computational resource needs. Further, the resulting processes and configurations are straightforward, economical, uncomplicated, highly versatile and effective, can be implemented by adapting known technologies, and are thus readily suited for incorporation into the widest variety of printing and display devices.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

The invention claimed is:

1. A method for image processing, the method comprising:
    loading one or more lines of to-be-processed image data into a data cache to form a first cache line width column of image data, each cache line in the first cache line width column of image data corresponding to a line of to-be-processed image data up to the width of the cache line;
    processing the first cache line width column of image data to enhance the image data;
    buffering cache line edge data associated with the first cache line width column of image data, wherein the cache line edge data includes data of one or more edge pixels of the first cache line width column of image data;
    loading another one or more lines of to-be-processed image data into a data cache to form a second cache line width column of image data;
    processing a first target pixel in the second cache line width column of image data to enhance the image data, wherein the first target pixel is processed based at least in part on (i) the loaded second cache line width column of image data and (ii) the buffered cache line edge data; and
    outputting the enhanced image data.

2. The method of claim 1, further comprising performing a cache line prefetch of image data.

3. The method of claim 1, wherein the processing and outputting further comprise:
    obtaining an image enhancement value for a second target pixel in the first cache line width column of the image data; and
    outputting an enhanced target pixel value according to the obtained image enhancement value.

4. The method of claim 1, wherein the processing and the outputting further comprise:

generating a 5 rows by 3 columns pixel window in the first cache line width column of image data from the data cache;
obtaining an image enhancement value for a second target pixel in the pixel window; and
outputting an enhanced target pixel value according to the obtained image enhancement value.

5. The method of claim 1, wherein the enhanced image data includes data from an enhancement procedure selected from artifact removal, single dot enhancement, line enhancement, contrast enhancement, color enhancement, resolution enhancement, or color trapping.

6. A method for image processing, the method comprising:
loading one or more lines of to-be-processed image data from a main memory into a microprocessor data cache to form a first cache line width column of image data, each cache line in the first cache line width column of image data corresponding to a line of to-be-processed image data up to the width of the cache line;
processing the first cache line width column of image data pixel by pixel to enhance the image data;
buffering cache line edge data associated with the first cache line width column of image data;
loading one or more other lines of to-be-processed image data from the main memory into the microprocessor data cache to form a second cache line width column of image data;
processing a first target pixel in the second cache line width column of image data to enhance the image data, wherein the first target pixel is processed based at least in part on (i) the loaded second cache line width column of image data and (ii) the buffered cache line edge data;
outputting the enhanced image data according to obtained image enhancement values;
storing the processed, enhanced cache line width column of image data into the main memory; and
printing an enhanced image using the enhanced image values.

7. The method of claim 6, further comprising performing a cache line prefetch of image data.

8. The method of claim 6, wherein the processing and the outputting further comprise:
obtaining an image enhancement value for a second target pixel in the first cache line width column of the image data; and
outputting an enhanced target pixel value according to the obtained image enhancement value.

9. The method of claim 6, wherein the processing and the outputting further comprise:
generating a 5 rows by 3 columns pixel window in the first cache line width column of image data from the microprocessor data cache;
obtaining an image enhancement value for a second target pixel in the pixel window; and
outputting an enhanced target pixel value according to the obtained image enhancement value.

10. A system for image processing, the system comprising:
a data cache;
processing circuitry for loading one or more lines of to-be-processed image data into the data cache to form a first cache line width column of image data, each cache line in the first cache line width column of image data corresponding to a line of to-be-processed image data up to the width of the cache line;
processing circuitry for processing the first cache line width column of image data to enhance the image data;
processing circuitry for buffering cache line edge data associated with the first cache line width column of image data;
processing circuitry for loading one or more other lines of to-be-processed image data into the data cache to form a second cache line width column of image data;
processing circuitry for processing a first target pixel in the second cache line width column of image data to enhance the image data, wherein the processing circuitry processes the first target pixel based at least in part on (i) the loaded second cache line width column of image data and (ii) the buffered cache line edge data; and
processing circuitry for outputting the enhanced image data.

11. The system of claim 10, further comprising processing circuitry for performing a cache line prefetch of image data.

12. The system of claim 10, wherein the processing circuitry for processing and the processing circuitry for outputting further comprise:
processing circuitry for obtaining an image enhancement value for a second target pixel in the first cache line width column of the image data; and
processing circuitry for outputting an enhanced target pixel value according to the obtained image enhancement value.

13. The system of claim 10, wherein the processing circuitry for processing and the processing circuitry for outputting further comprise:
processing circuitry for generating a 5 rows by 3 columns pixel window in the first cache line width column of image data from the data cache;
processing circuitry for obtaining an image enhancement value for a second target pixel in the pixel window; and
processing circuitry for outputting an enhanced target pixel value according to the obtained image enhancement value.

14. The system of claim 10, wherein the enhanced image data includes data from an enhancement procedure selected from artifact removal, single dot enhancement, line enhancement, contrast enhancement, color enhancement, resolution enhancement, or color trapping.

* * * * *